No. 788,480.

Patented April 25, 1905.

UNITED STATES PATENT OFFICE.

HUGO LIEBER, OF NEW YORK, N. Y.

PRESERVED RADIO-ACTIVE ORGANIC MATTER AND FOOD.

SPECIFICATION forming part of Letters Patent No. 788,480, dated April 25, 1905.

Original application filed March 12, 1904, Serial No. 197,838. Divided and this application filed June 17, 1904. Serial No. 213,047.

*To all whom it may concern:*

Be it known that I, HUGO LIEBER, a citizen of the United States, residing in the city, county, and State of New York, have invented a certain new and useful Improvement in Preserved Radio-Active Organic Matter and Food, of which the following is a specification.

This invention relates to the impregnation of food and organic matter with emanations from a radio-active substance, and has for its object a new article of manufacture—to wit, preserved radio-active food and organic matter impregnated with emanations from a radio-active substance—as hereinafter more particularly described and for the purpose stated.

As set forth in my application filed March 12, 1904, Serial No. 197,838, for Letters Patent for improvement in radio-active matter impregnated with thorium emanations and in the manufacture thereof, of which this application is a division, thorium is a radio-active substance, and it emits and radiates rays called "Becquerel rays." In addition to the emission of Becquerel rays thorium gives off emanations of gaseous particles. The emanations from thorium can be utilized to render other substances radio-active. Other substances rendered radio-active by means of thorium emanations may be said to be secondarily radio-active. As set forth in my said application, I have discovered that solid and liquid substances can be impregnated with thorium emanations and can thereby be rendered persistently radio-active or radio-active in such degree that they retain their radio-activity for a considerable length of time and that a satisfactory method of obtaining the emanations from thorium and of utilizing them is by heating thorium oxid below red heat and then by means of an air-current or similar device blowing the emanations into the matter to be impregnated or made radio-active or otherwise bringing the thorium emanations into intimate contact therewith. Heat is preferably applied in order to facilitate the giving off of the thorium emanations; but thorium gives off the emanations without heat. Instead of thorium oxid there can be used in like manner for the obtaining of emanations other forms of thorium—for example, thorium nitrate, preferably in solution with water. Should thorium nitrate be used, the use for which the impregnated radio-active substance may be intended may require the neutralization of any free nitric acid present. For the purpose for which my present invention is primarily intended, the preservation of food and other decomposable matter, I prefer, therefore, to use thorium oxid for the obtaining of the thorium emanations. As described in my said application filed March 12, 1904, the thorium emanations being blown into or otherwise brought into intimate contact with the substance to be impregnated therewith the substance is impregnated with the thorium emanations and rendered persistently radio-active—that is, radio-active to such an extent and degree that the radio-activity will be retained for a considerable length of time and will enable the radio-active substance impregnated with the thorium emanations to be used for many purposes. Furthermore, as described in my said application filed March 12, 1904, substances may be impregnated with thorium emanations by mixing thorium oxid therewith. The emanations given off by the thorium oxid of the mixture come into intimate contact with the substance, impregnate it, and render it radio-active.

I have discovered that the impregnation of substances with emanations from a radio-active substance, thereby rendering the substances radio-active, can be utilized for the preservation of food and organic matter and the production of a new article of manufacture—to wit, preserved radio-active food and organic matter impregnated with emanations from a radio-active substance for the purpose stated—and this discovery forms the basis of my present application. Foods such as canned foods, meat, beef extracts, and other manufactured or prepared foods, milk, cheese, cream, and the compounds thereof, fruits, jams, juices, jellies, and preserves generally and decomposable matter generally can be impregnated with thorium emanations and rendered radio-active in the manner above described, for example, and can thereby be preserved from decomposition and decay.

As is well known, nitrogen is a constituent too of albumen, and nitrogen and albumen are constituents of many animal and vegetable foods which are known as "nitrogenous" or "albuminous" foods.

In the case of solids it may be necessary to heat the solid to the liquid form and to blow the emanations into the matter while in the liquid form, or if the solid substance is in a comminuted condition or is sufficiently porous the thorium emanations may be brought into contact and combined with the particles of the solid substance throughout its mass by blowing the thorium emanations into and throughout the particles of the solid substance. In the case of solid foods and other matter manufactured, prepared, or preserved with a liquid, juice, syrup, or the like the emanations will thoroughly impregnate the liquid, juice, or syrup, and the impregnated liquid, juice, or syrup surrounding and penetrating any solid substance within it will preserve the entire matter, solid and liquid, from decomposition and decay.

Radium is a radio-active substance which, like thorium, emits and radiates Becquerel rays and in addition gives off emanations similar to those given off by thorium. The emanations from radium can be used, according to my invention, in the manner described for the use of thorium emanations for the impregnation of substances with the emanations, thereby rendering them radio-active and for the preservation of food and decomposible matter.

I am aware that thorium salts have been dissolved in water previous to my invention, and such is not my invention. When a salt of thorium is dissolved in water or other liquid, the thorium salt permeates the water or other liquid in which it is dissolved. When, however, according to my invention as above described, thorium emanations are given off, the thorium emanations are separate and free from the thorium from which they were obtained, and when the thorium emanations so obtained are brought into intimate contact with the matter to be rendered radio-active and preserved and impregnate the matter, combining with the particles of the matter throughout the mass of the matter, the matter so impregnated is free from the thorium from which the thorium emanations were obtained and is radio-active and preserved by reason of the emanations or gaseous particles separated from the thorium by which they were given off and combined with the particles of the preserved matter throughout its mass.

In view of the purpose and object of this invention— namely, the preservation of food and other organic matter by preventing decomposition and decay resulting, for instance, from the development of mold, of fermentation, and of various kinds of germs, and from such other causes as induce the decomposition and decay of organic matter—what I claim is—

1. Preserved organic matter, consisting of organic matter and thorium emanations free from the thorium from which they were obtained in combination with the particles of the preserved matter throughout its mass, the organic matter being radio-active by reason of the thorium emanations embodied within it, substantially as described.

2. Preserved solid food, consisting of solid food and thorium emanations free from the thorium from which they were obtained, in combination with the particles of the preserved food throughout its mass, the food being radio-active by reason of the thorium emanations embodied within it, substantially as described.

3. Preserved food, consisting of solid food contained within a liquid and thorium emanations free from the thorium from which they were obtained, in combination with the particles of the preserved food throughout its mass, the food being radio-active by reason of the thorium emanations embodied within it, substantially as described.

4. Preserved albuminous food, consisting of albuminous food and thorium emanations free from the thorium from which they were obtained, in combination with the particles of the preserved albuminous food throughout its mass, the albuminous food being radio-active by reason of the thorium emanations embodied within it, substantially as described.

5. Preserved nitrogenous food, consisting of nitrogenous food and thorium emanations free from the thorium from which they were obtained, in combination with the particles of the preserved nitrogenous food throughout its mass, the nitrogenous food being radio-active by reason of the thorium emanations embodied within it, substantially as described.

6. Preserved animal food, consisting of animal food and thorium emanations free from the thorium from which they were obtained, in combination with the particles of the preserved animal food throughout its mass, the animal food being radio-active by reason of the thorium emanations embodied within it, substantially as described.

In testimony whereof I have signed my name to this specification in the presence of two subscribing witnesses.

HUGO LIEBER.

Witnesses:
REBECCA BALLEISEN,
CATHERINE M. BEHAN.